(12) United States Patent
Mariën et al.

(10) Patent No.: US 6,468,609 B2
(45) Date of Patent: Oct. 22, 2002

(54) UV-ABSORBING FILM AND ITS USE AS PROTECTIVE SHEET

(75) Inventors: August Mariën, Westerlo; Bart Moeyersons, Kortenberg, both of (BE)

(73) Assignee: Agfa-Gevaert, Mortsel (BE)

( * ) Notice: Subject to any disclaimer, the term of this patent is extended or adjusted under 35 U.S.C. 154(b) by 15 days.

(21) Appl. No.: 09/725,535

(22) Filed: Nov. 29, 2000

(65) Prior Publication Data

US 2001/0003363 A1 Jun. 14, 2001

Related U.S. Application Data

(60) Provisional application No. 60/170,885, filed on Dec. 15, 1999.

(30) Foreign Application Priority Data

Dec. 1, 1999 (EP) .............................................. 99204076

(51) Int. Cl.$^7$ .......................... C09K 15/08; B32B 23/04
(52) U.S. Cl. ........................ 428/1.1; 252/588; 252/589; 106/171.1; 524/100; 524/325; 524/351
(58) Field of Search ................................. 252/588, 589; 524/100, 325, 351; 106/171.1; 428/1.1

(56) References Cited

U.S. PATENT DOCUMENTS

| | | | | |
|---|---|---|---|---|
| 3,244,708 A | * | 4/1966 | Duennenberger et al. | ... 252/401 |
| 5,516,456 A | * | 5/1996 | Shinohara et al. | ..... 252/299.01 |
| 5,997,769 A | * | 12/1999 | Tittmann et al. | ............ 252/403 |
| 6,242,597 B1 | * | 6/2001 | Gupta et al. | ................. 544/216 |
| 6,320,042 B1 | * | 11/2001 | Michihata et al. | ...... 106/168.01 |

FOREIGN PATENT DOCUMENTS

| | | | |
|---|---|---|---|
| CH | 422316 | | 4/1967 |
| CH | 422319 | | 4/1967 |
| CH | 480091 | | 10/1969 |
| JP | 19970259083 | | 9/1997 |
| JP | 2001-072782 | * | 3/2001 |
| WO | WO 97/40409 | | 10/1997 |
| WO | WO 99/57189 | | 11/1999 |

* cited by examiner

*Primary Examiner*—Robert Dawson
*Assistant Examiner*—Marc S Zimmer
(74) *Attorney, Agent, or Firm*—Joseph T. Guy; Nexsen Pruet Jacobs & Pollard, LLC

(57) ABSTRACT

UV-absorbers of the 4-alkoxy-2-hydroxyphenyl-s-triazine type are incorporated in a cellulose triacetate film. Such an UV-cut off film can be used advantageously, amongst others, as protective sheet for a polarizer in a Liquid Crystal Display.

6 Claims, No Drawings

UV-ABSORBING FILM AND ITS USE AS PROTECTIVE SHEET

This application claims benefit of provisional application No. 60/170,885 filed Dec. 15, 1999.

FIELD OF THE INVENTION

The present invention relates to a UV-absorbing cellulose triacetate film (CTA) containing a particular type of UV-absorbing substance.

BACKGROUND OF THE INVENTION

UV-absorbing sheets can be used in a number of applications. For instance, they can be used as UV-cut off films for sunglasses or polarizing glasses, as colour correction filters for recording and printing in colour photography, and for other special uses such as separation filter, masking filter for photomechanical process, and visual sensivity filter. Recently such films have found use as a protective foil for a polarizing plate in a Liquid Crystal Device.

In the field of electronic display systems flat panel displays (FDPs) devices have become of increasing importance and are replacing older technologies such as CRTs especially due to the advent of hand-held, laptop and portable computers. FDPs can be categorized into different types, a recent survey of which can be found in chapter 3 of "Electronic displays", second edition (1996) by Sol Sherr, edited by J. Wiley and Sons. Among the so-called electroluminescent devices the most successful representative is the light-emitting diode or LED. It is a solid device emitting light upon the application of an electric field. Gas-discharge displays, also called plasma display panels use the ionisation of the gas by the application of a field across the gas and radiative recombinations of the ions and the electrons. They are used to a considerable extent as displays for portable computers and are among the leading contenders for FDP products. Still other types of flat panel display devices include vacuum fluorescent displays (VFDs), electromagnetic displays (EMDs), incandescent displays (INDs), electrochemical displays (ECDs) and electrophoretic image displays (EPIDs).

However, the most popular and widely accepted type of flat panel display device in recent times is without any doubt the liquid crystal display device or LCD which has become the market leader. Liquid crystal display devices are used nowadays in numerous applications such as clocks, household appliances, electronic calculators, audio equipment, etc. There is a growing tendency to replace cathode ray tubes by liquid crystal display devices being favoured for their smaller volume and lower power consumption. In some applications like e.g. laptop computers and pocket TV's liquid crystal display devices are even without competition.

High definition television in its ultimate version will require screen diagonals exceeding 50 inch (see P. Plezhko in the periodical Information Display September 1991, Vol. 7 no. 9, p. 19 a.f.). Although not yet in existence CRT-based 50 inch screens can be expected to be very impractical because of their weight and size. Liquid crystal technology is basically able to produce high definition television (HDTV) screens with moderate weight and size.

Liquid crystal display devices generally include two parallel spaced glass panels connected to each other, which define a sealed cavity, which is filled with a liquid crystal material. The liquid crystals exhibit a specific geometrical molecular orientation depending on their type that can be changed under influence of an electric field. The glass plates are each covered with a transparent electrode layer facing the cavity which may be patterned in such a way that a mosaic of picture elements (pixels) is created or that a defined electronic pattern is created e.g. having a defined alpha-numerical shape. Finally the front and rear glass plates are at the outside covered with light polarizing elements. As a result of change in the geometrical orientation of the liquid crystal molecules due to an applied electric voltage difference between the electrodes the light transmittance properties of a background illumination source are simultaneously changed.

In general, there are from a chemical point of view two important types of polarizers, iodine type (I-type) and chromophore or dye type polarizers. The dye types (D-type) are in general stretched poly(vinyl alcohol) films comprising a diazo compound. They are more stable against humidity and heat than the I-type sheets which on the other hand show a higher transmittance. However, both types are extremely sensitive to deterioration by UV radiation so that they have to be shielded off completely from UV by means of a UV-cut off protecting sheet. Such a protective polymeric sheet can furtheron assure protection against mechanical damage, evenness of surface, and little change of dimension depending on variation of temperature and humidity.

According to recent patent publications cellulose triacetate film in which a UV-absorbing compound is incorporated is a preferred polymeric material for use as protective element for polarizers in a LCD. Cellulose triacetate is apparently preferred because it has a high transparency, is optically isotropic, has good adhesion to the polarizing plate and a little change of dimension depending on variation of temperature and humidity. For instance, unexamined Japanese patent publications JP-A 10-237186, 10-152568 and 7-11056 disclose benzotriazole derivatives as UV absorbers in cellulose triacetate sheets for the latter purpose. JP-A 08-134241 describes a benzophenone derivative as UV-absorber in cellulose triacetate. JP-A 08-239509, equivalent to U.S. Pat. No. 5,806,834, discloses UV-cut off polymeric films comprising R1R2NCR3:CR4CR5:CXY compounds as UV absorbers and their use in polarizers of LCD's. Furtheron, benzophenone compounds, salicylate compounds and benzotriazole compounds have been described in UV absorbing sheets in JP-A 05-265078.

However, the UV absorbing films as described in prior art exhibit several drawbacks. For instance, the gradient in their transmittance curve (the rise of the curve) is not steep enough around 400 nm. Such a film shows a yellow hue and/or an incomplete cut off of UV.

The present invention extends the teachings on polymeric films comprising an UV absorber, and their use as protective sheet for a polarizer in a LCD.

OBJECTS OF THE INVENTION

It is the object of the invention to provide an ultraviolet-absorbing polymer film capable of transmitting almost thoroughly light in a wavelength region of longer than 400 nm and cut off almost thoroughly light in a wavelength region shorter than 400 nm.

It is a further object of the present invention to provide a polarizer element efficiently protected by such a UV-absorbing polymer film.

It is still a further object of the present invention to provide an LCD comprising polarizers protected against deterioration by UV-radiation.

SUMMARY OF THE INVENTION

The above mentioned objects are realised by providing a cellulose triacetate film comprising a UV absorber according to general formula (I)

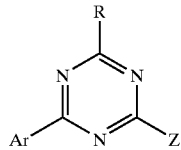

wherein Z represents 4-alkoxy-2-hydroxyphenyl which can be further substituted,

Ar represents substituted or unsubstituted aryl, and

R represents alkyl, aryl, alkoxy, aryloxy, alkylthio or arylthio, each of which can be further substituted.

The invention further encompasses polarizing elements protected by such CTA films, and LCD devices comprising such polarizers.

Further advantages and embodiments of the present invention will become apparent from the following description.

DETAILED DESCRIPTION OF THE INVENTION

The synthesis of 2-hydroxyphenyl-s-triazines is disclosed in U.S. Pat. No. 3,896,125.

The most preferred 4-alkoxy-2-hydroxyphenyl-s-trazine UV-absorbers used in accordance with the present invention are following compounds:

(I-1)
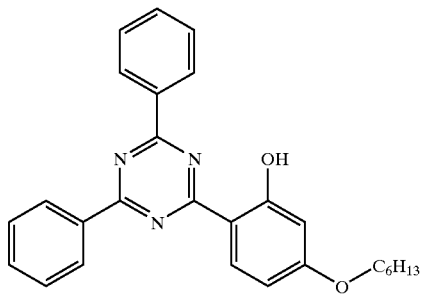

(I-2)
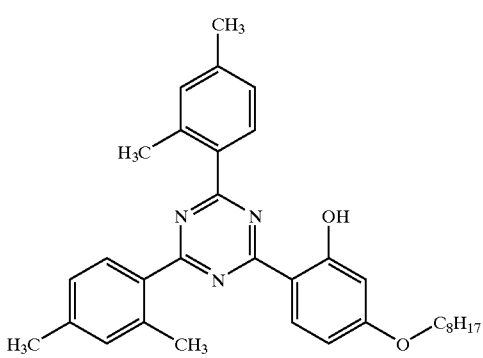

Other useful UV-absorbers include (I-4)
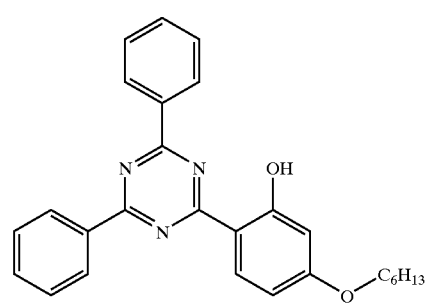

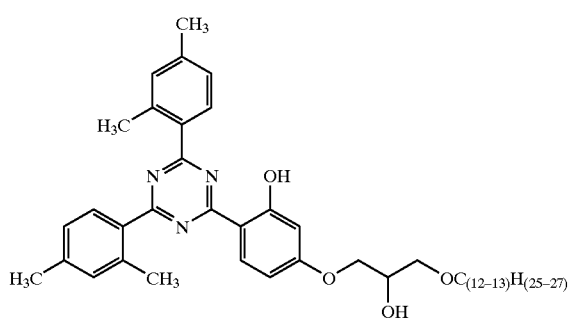

(I-5)

(I-6)
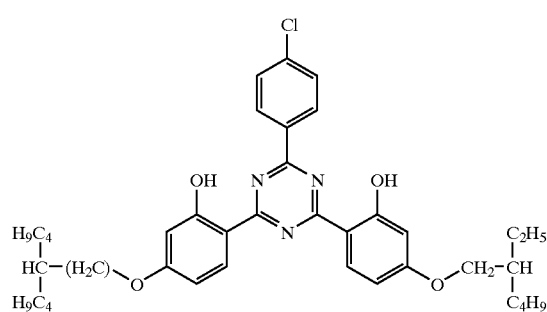

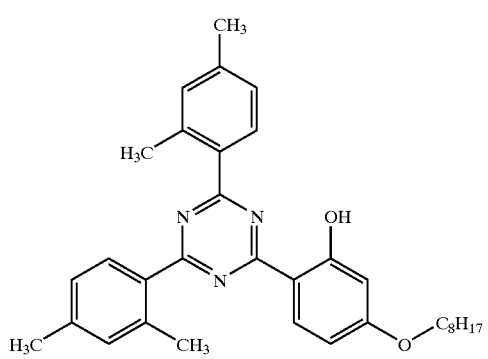

-continued

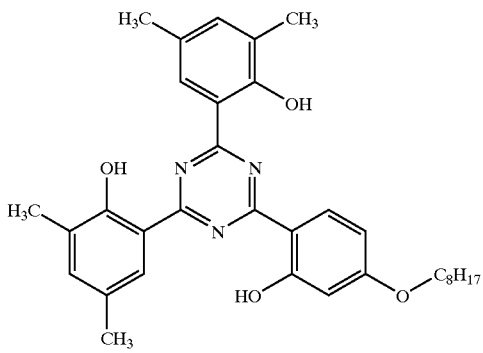
(I-7)

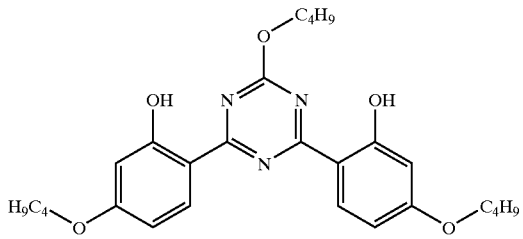
(I-8)

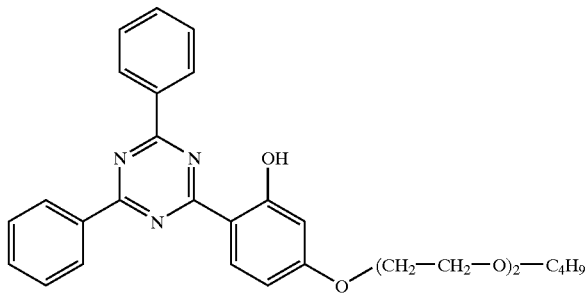
(I-9)

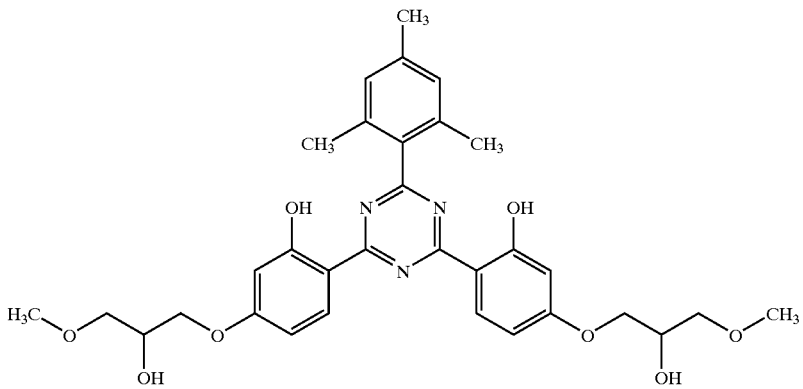
(I-10)

The cellulose triacetate film of the invention is capable of transmitting almost all light in a wavelength region of longer than approx. 400 nm and cutting off almost all light in a wavelength region of not longer than approx. 400 nm, and further its transmittance curve steeply rises around 400 nm. Hence, the polymer film can be suitably employed as a protective film for a polarizing plate showing excellent light resistance.

Furtheron, the film of the invention can be utilized, optionally in combination with another optical filter, as colour correction filter for taking colour photographs, as color correction filter in colour printing or as a filter for especial use (e.g., separation filter, masking filter for photomechanical process, visual sensitivity filter).

As cellulose triacetate film the known materials can be employed. The acetyl value of cellulose triacetate preferably is in the range of 50 to 70%, especially in the range of 55 to 65%. The weight average molecular weight of cellulose triacetate preferably is in the range of 70,000 to 120,000, especially 80,000 to 100,000. Cellulose triacetate may contain other cellulose esters such as cellulose propionate or cellulose butyrate so long as the acetyl value satisfies the indicated range.

The ultraviolet absorber of the formula (I) is generally incorporated in the polymer in an amount of 0.1 to 20 weight parts based on 100 weight parts of cellulose triacetate, more preferably in an amount of 0.1 to 10 weight parts, and most preferably in an amount of 1 to 5 weight parts.

It will be readily understood that mixtures of more than one UV-absorber used in accordance with the invention can be incorporated. Furtheron other UV-absorbers out of the scope of the present invention can be admixed. Preferred are benzophenone compounds, salicylate compounds and benzotriazole compounds.

The cellulose acetate film generally further contains a plasticizer. Examples of the plasticizers include phosphate esters such as triphenyl phosphate, tricresyl phosphate and cresyl diphenyl phosphate; and phthalate esters such as diethyl phthalate, dimethoxyethyl phthalate and dimethyl phthalate. The plasticizer is preferably contained in the film in an amount of not more than 20 weight %, especially of 5 to 15 weight %.

The CTA film may further contain particles of an inorganic or organic compound to give a good lubricating property. Examples of inorganic compounds include silicon dioxide, titanium dioxide, aluminium oxide, zirconium oxide, calcium carbonate, talc, clay, calcined kaolin, calcined calcium silicate, hydrated calcium silicate, aluminium silicate, magnesium silicate and calcium phosphate. Preferred are silicon dioxide, titanium dioxide and zirconium oxide, and especially silicon dioxide. Examples of organic polymeric compounds include silicone resin, fluoro resin and acrylic resin. Preferred is silicone resin. The average size of the particle is not especially restricted. The size generally is in the range of 0.001 to 1.0 μm, preferably 0.001 to 0.5 μm. The particle is generally incorporated in an amount of 0.005 to 0.5 weight parts in the CTA film based on 100 weight parts of the CTA, and preferably in an amount of 0.01 to 0.1 weight parts.

A process for the preparation of the UV-absorber containing CTA film of the invention is explained below.

The film is preferably prepared by utilizing the solvent casting method. This method comprises the steps of: casting the polymer solution fed from a slit of a solution feeding device (die) on a support and drying the casted layer to form a film.

In a mixing vessel, a solvent, cellulose triacetate and a plasticizer are placed, and cellulose acetate is dissolved by stirring under heating, and if desired under pressure, to prepare a dope. In another mixing vessel, a solvent and the ultraviolet absorber are placed, and the absorber is dissolved by stirring. In the case that particles to improve lubrication are added, the particles are placed in the resultant absorber containing solution and the mixture is dispersed using a dispersing equipment. An appropriate amount of the absorber containing solution is fed to the vessel holding the dope, and they are mixed. The resulting mixture is fed to a casting head appropriately through a filter, and is casted from the casting head on a endless belt of a support, preferably a metal support.

The casted film is dried during one rotation of the belt to form a film having self-bearing properties, and the dried film is separated from the belt, and then the film is sufficiently dried to be wound. A metal drum can be utilized instead of the endless belt.

The dope and the absorber containing solution can be mixed by the use of a static mixer which is mounted midway of the piping before the casting head, fed to the casting head and casted from the casting head on a metal support.

Examples of solvents employed in the solvent casting method include aliphatic hydrocarbons such as pentane, hexane, heptane, octane, isooctane and cyclohexane; aromatic hydrocarbons such as benzene, toluene and xylene; chlorinated hydrocarbons such as chloromethane, dichloromethane, carbon tetrachloride and trichloroethane; alcohols such as methanol, ethanol, isopropyl alcohol and n-butyl alcohol; and esters such as methyl formate, ethyl formate, methyl acetate and ethyl acetate.

In the present case of employing cellulose triacetate as the polymer, a solvent mixture of dichloromethane and methanol is generally employed. Other solvents such as isopropyl alcohol and n-butyl alcohol can be employed so long as cellulose triacetate is not deposited during the procedure preparing the dope or adding the particles to the dope. The ratio of cellulose triacetate and the solvent in the dope is preferably 10:90 to 30:70 by weight.

In the procedure of preparing the dope and the dispersion, various additives such as a dispersing agent, a fluorescent dye, an antifoamer, a lubricant, and a preservative can be added to the dope or to the dispersion.

A polarizing element comprising a polarizing sheet covered on one or both sides with a protective UV absorbing cellulose triacetate film belongs also to the scope of the present invention. The protective film is applied on one or both sides of the polarizing sheet by means of lamination.

Any type of polarizer (I-type or D-type) can be used. In a preferred embodiment the polarizer consists of stretched poly(vinyl alcohol) film containing a diazo compound.

It is also explicitly considered that a liquid crystal display device comprising such polarizers protected by a UV-absorbing cellulose triacetate film as described above belongs to the scope of the present invention. The polarizers are applied on the outer sides of the glass or plastic substrates of the LCD device. Therefore we include in this description some details about the design and operation of a liquid crystal display device.

As already explained above the device is in essence a cavity surrounded by two parallel glasses each covered on the inside with a transparent electrode layer in electrical connection with each other so that an electric field can be applied across the cell. Finally the electrode layers are covered with so-called alignment layers (see furtheron). Furtheron, a colour filter layer can be present. The whole assemblage is inserted between two polarizers. In the present invention the polarizers are protected by a UV-cut off CTA film as extensively explained above.

Liquid crystals look like ordinary liquids over most of the temperature range but they differ from other liquids in that in the so-called mesophase temperature range they show an ordered structure and are made up of elongated organic molecules that can arrange themselves into three types of ordening called nematic, cholesteric and smectic. In the nematic type all the molecules are parallel to each other. The cholesteric has consecutive layers of molecules parallel to each other, but with an alignment in each layer in a preferred direction that rotates continuously from one layer to the next thus following a helix in its ordering pattern. The smectic type has a layered structure with a constant preferred direction. Outside the mesophase the material freezes at the low end and becomes an isotropic liquid at the high end. The majority of LCDs use the nematic type, but there are examples of devices that use cholesteric, cholesteric-nematic, and smectic mixtures. In particular, certain chiral-smectic forms have been used that exhibit spontaneous polarization, and the LCDs containing this type of material are termed ferroelectric. More details on liquid crystals can be found in GB 1509643, in *Scientific American*, Vol. 222, April 1970, p. 100–106, and in the periodical OEP, February 1985, p. 43–47, under the headings "Spectrum Liquid Crystal Display" and "Liquid Crystal gets Second Look as a promising Display Medium".

Liquid crystals have usually rather complex chemical formulas. Crystals of the nematic type include for instance 4-methoxy-4'-n.-butylazoxybenzene (MBAB), N-(p-methoxybenzilidene)-p-n.-butylaniline (MBBA) and N-(p-ethoxybenzilidene)-p-n.-butylaniline (EBBA). Molecules of the cholesteric type include cholesteryl erucate (CE) and cholesteric nonanoate (CN).

We will now explain the operation principle of the most popular type of LCD being the Twisted Nematic Structure LCD (TN-LCD) which has find wide applications both in its original form and in its improved supertwist version. In this form the cell is constructed in such a fashion that, in the absence of an electric field, the molecular axis of the liquid crystal material is made to rotate continuously from one glass plate to the other comparable to the steps in a winding staircase. This is achieved as follows. Both electrode layers together with all the other elements facing the interiority of the LCD are covered with thin so-called alignment layers. These layers usually consist of a heat-cured polyimide resin. Rubbing these cured layer with e.g. a nylon cloth (ref. e.g. GB-P 1,505,192) in a given direction causes an orientation of the liquid crystal molecules near the surface of the layer in the rubbing direction. When both alignment layers are rubbed in directions perpendicular to each other the rotating molecular direction arrangement described above is obtained. As a result, linearly polarized light produced from a first polarizer positioned outside the first glass plate and incident on the cell is rotated in the same way and emerges from the second glass plate with its plane of polarization at 90° from the incoming light. When a second polarizer, commonly termed analyzer, is positioned behind the second glass plate, and its polarizing plane is parallel to the one of the the first polarizer then the analyzer will block the light. On the other hand, if the analyzer's polarizing plane is perpendicular to the one of the first polarizer the light will be passed.

However, when an electric field is applied between the electrodes the molecules are untwisted and all line up in the direction of the field. Now a parallel analyzer will pass the light and a right-angle analyzer will block the light. Summarizing, according to the chosen relative direction of polarizer and analyzer, a light display on a dark background, or a dark display on a light background can be realized.

The UV-absorber containing protective CTA film shields the polarizer(s) from the UV rays of the light source.

The present invention will now be illustrated by the following examples without however being limited thereto.

EXAMPLES

Example 1

This example compares the UV-cut off properties of CTA film samples containing the invention compounds I-1 and I-2 with comparison film samples comprising known UV-absorbers.

Formulas of comparative compounds

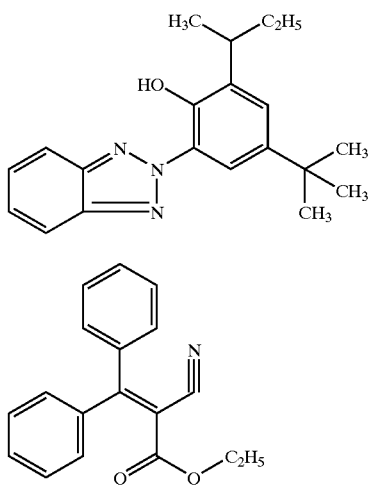

C-1

C-2

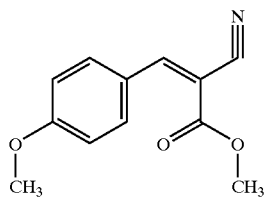

C-3

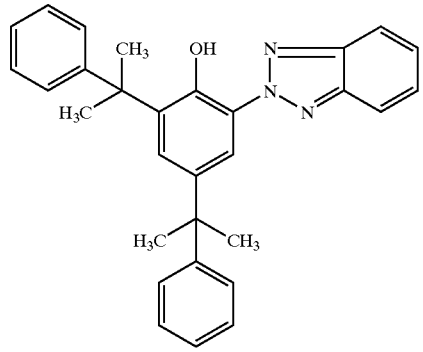

C-4

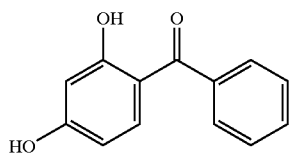

C-5

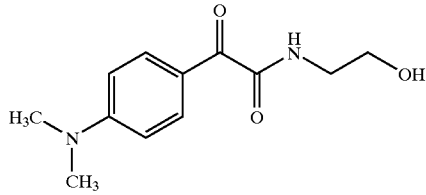

C-6

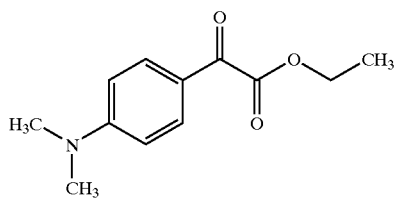

C-7

Preparation of the Film Samples

In a glass reactor vessel of 500 ml equipped with an efficient stirrer 3.5 g of triphenylphosphate (plasticizer) was dissolved whilst stirring in a solvent mixture of 250 g of methylenechloride and 25 g of methanol. To this solution were added respectively 35 g of CTA and no UV-absorber (blank);

34.65 g of CTA and 0.35 g of UV-absorber (final conc. 1% by weight);

34.125 g of CTA and 0.875 g of UV-absorber (final conc. 2.5% by weight);

33.25 g of CTA and 1.75 g of UV-absorber (final conc. 5% by weight).

The mixtures were stirred at room temperature until clear solutions were obtained.

Onto a glass coating plate of 200×300 mm each of the prepared solutions was coated with a coating knife at a wet thickness of about 1 mm.

After drying at room temperature the film samples were removed from the coating plate and further dried at 50° C. for 1 hour. Then the samples were solvent free and had a thickness of 90 μm.

Evaluation

From each film sample a spectral transmittance curve was recorded from 250 nm to 800 nm.

In table 1 the wavelengths of 0% transmittance are the longest wavelength of the % transmittance spectral curve whereby the UV absorption is still complete or practically complete. The wavelength of 90% transmittance is the shortest wavelength whereby the transmittance reaches 90%. The smaller the difference between the two values the steeper the rise of the transmittance curve around 400 nm, and the better the UV-cut off properties.

TABLE 1

| comp. No. | conc. % | nm 0% transm. | nm 90% transm. | Δ |
|---|---|---|---|---|
| blank | — | 260 | 375 | 115 |
| I-1 | 1 | 360 | 415 | 55 |
| " | 2.5 | 370 | 425 | 55 |
| " | 5 | 380 | 430 | 50 |
| I-2 | 1 | 350 | 400 | 50 |
| " | 2.5 | 360 | 410 | 50 |
| " | 5 | 370 | 420 | 50 |
| C-1 | 1 | 365 | 405 | 40 |
| " | 2.5 | 375 | 415 | 40 |
| " | 5 | 385 | 415 | 30 |
| C-2 | 1 | 330 | 380 | 50 |
| " | 2.5 | 345 | 400 | 55 |
| " | 5 | 350 | 405 | 55 |
| C-3 | 1 | 345 | 400 | 55 |
| " | 2.5 | 360 | 405 | 45 |
| " | 5 | 370 | 410 | 40 |
| C-4 | 1 | 365 | 405 | 40 |
| " | 2.5 | 375 | 410 | 35 |
| " | 5 | 380 | 415 | 35 |
| C-5 | 1 | 345 | 400 | 55 |
| " | 2.5 | 355 | 410 | 55 |
| " | 5 | 365 | 420 | 55 |
| C-6 | 1 | 415 | 470 | 55 |
| " | 2.5 | 425 | 500 | 75 |
| " | 5 | 435 | 570 | 135 |
| C-7 | 2.5 | 410 | 480 | 70 |

As can be seen from table 1 the invention compounds exhibit a similar cut off behaviour as the comparison compounds, and therefore constitute valuable alternatives to these known compounds.

Example 2

All film samples of the previous example were subjected to a light-stability test consisting of an exposure for 144 hours to a xenon light source of 180,000 Lux. Again a spectral transmittance curve was recorded from each sample and compared to the unexposed sample. The invention compounds showed no deterioration at all of their UV-cut off properties, nor was this the case for the comparison compounds except for C-6 and C-7.

What is claimed is:

1. A polarizing element comprising a polarizing sheet covered on one or both sides with a protective cellulose triacetate film comprising a UV absorber according to general formula (I):

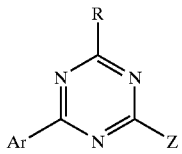

wherein Z represents 4-alkoxy-2-hydroxyphenyl which can be further substituted,

Ar represents substituted or unsubstituted aryl, and

R represents alkyl, aryl, alkoxy, aryloxy, aklylthio or arylthio, each of which can be further substituted.

2. A polarizing element comprising a polarizing sheet covered on one or both sides with a protective cellulose triacetate film according to claim 1 wherein said UV absorber is chosen from following compounds:

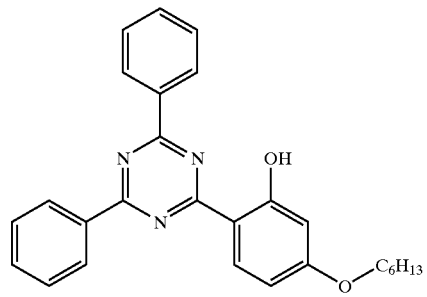

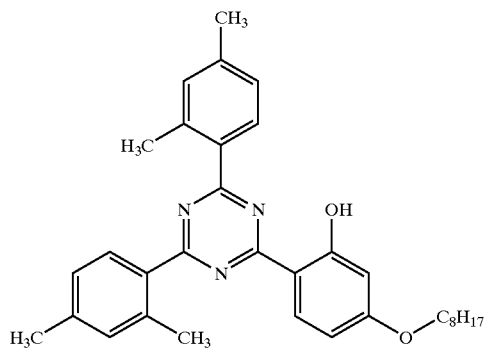

3. A liquid crystal display (LCD) comprising a polarizing element according to claim 1.

4. A liquid crystal display (LCD) comprising a polarizing element according to claim 2.

5. A polarizing element comprising a polarizing sheet covered on one or both sides with a protective cellulose triacetate film comprising a UV absorber chosen from the following compounds:

13
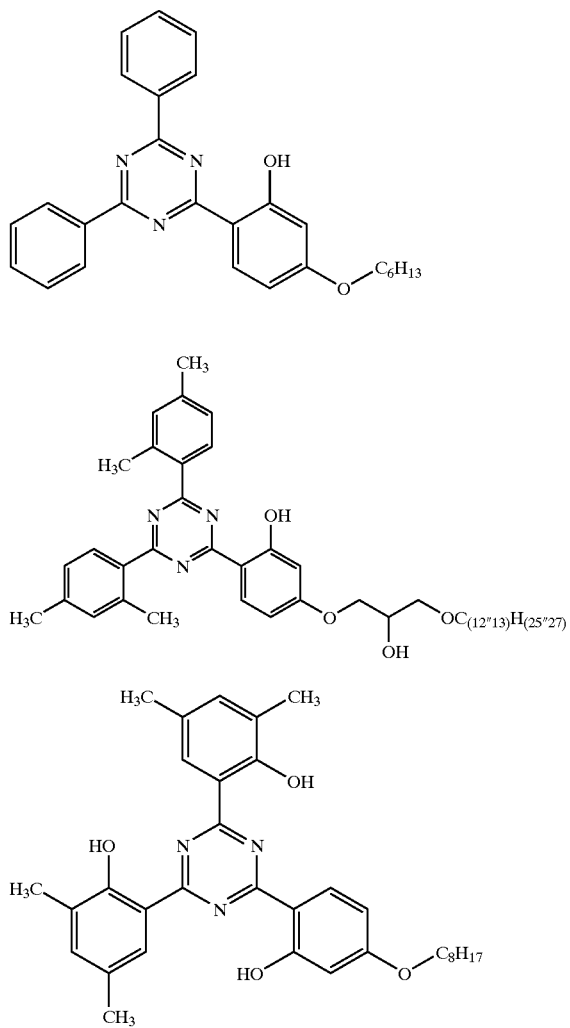
14
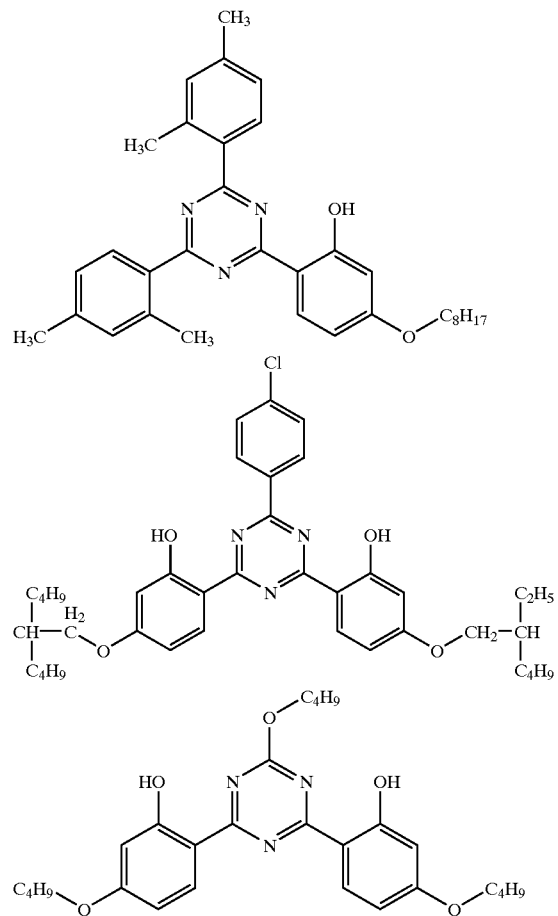
and
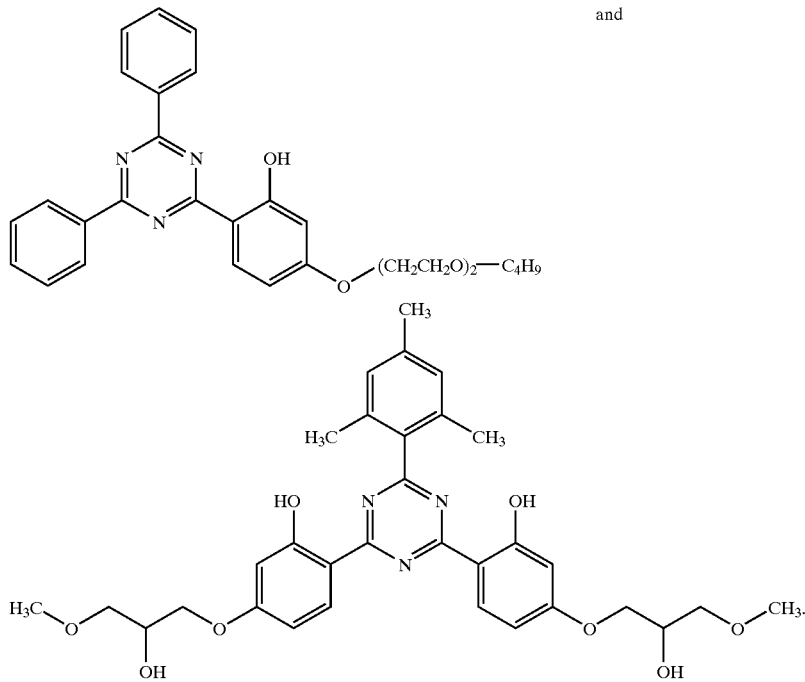

6. A liquid crystal display comprising a polarizing element comprising a polarizing sheet covered on one or both sides with a protective cellulose triacetate film comprising a UV absorber chosen from the following compounds:
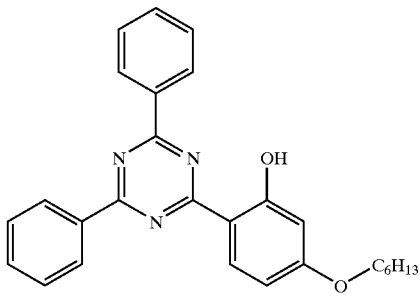
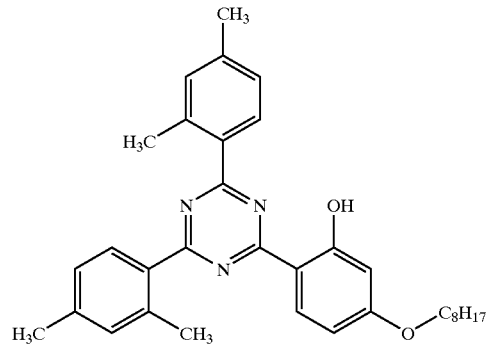
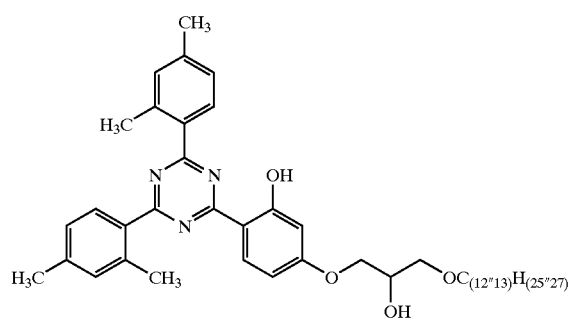
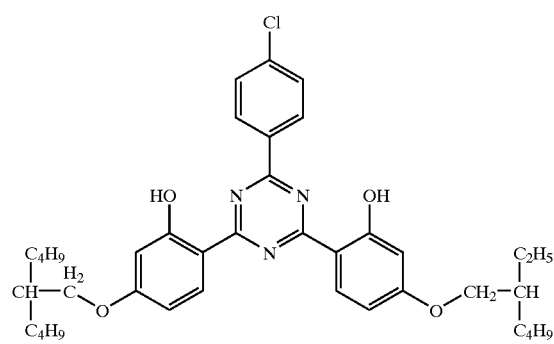
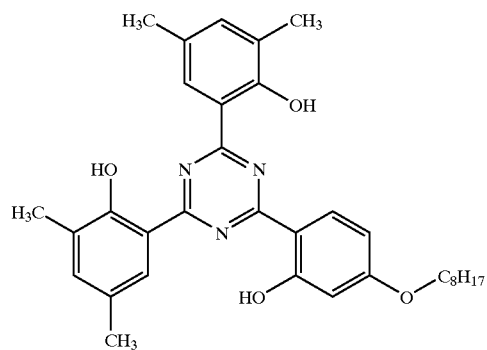
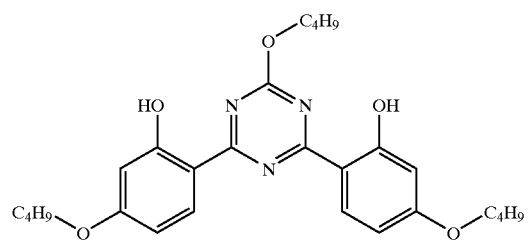
and
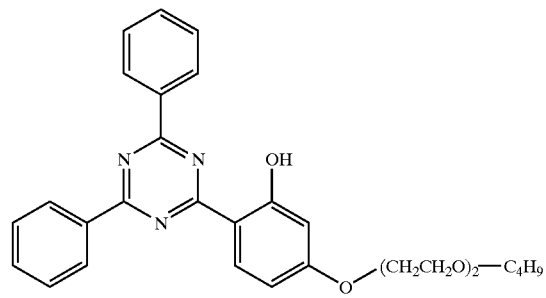

-continued
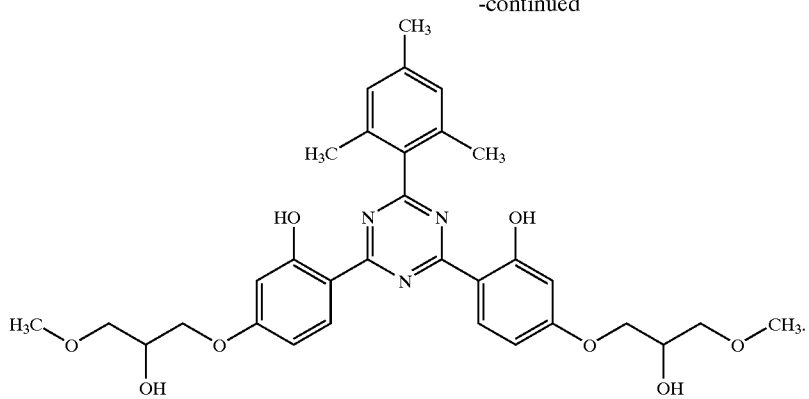
* * * * *